United States Patent [19]

Poncet

[11] Patent Number: 5,711,974
[45] Date of Patent: Jan. 27, 1998

[54] BLOW-MOLDING PRESS

[75] Inventor: Dominique Poncet, Peron, France

[73] Assignee: Jean Gallay S.A., Plan-les-Ouates, Switzerland

[21] Appl. No.: 717,863

[22] Filed: Sep. 23, 1996

[30] Foreign Application Priority Data

Sep. 29, 1995 [FR] France ................... 95 11748

[51] Int. Cl.⁶ .................................................. B29C 49/56
[52] U.S. Cl. .................................. 425/541; 425/451.5
[58] Field of Search .................. 425/541, 451.5, 425/451.9

[56] References Cited

U.S. PATENT DOCUMENTS

| | | | |
|---|---|---|---|
| 3,501,809 | 3/1970 | Kinsley | 425/541 |
| 3,749,541 | 7/1973 | Mehnert | 425/541 |
| 3,860,375 | 1/1975 | Kinslow, Jr. et al. | 425/541 |
| 3,989,437 | 11/1976 | Kiefer et al. | 425/541 |
| 4,878,828 | 11/1989 | Wollsclager et al. | 425/541 |
| 5,388,981 | 2/1995 | Scharrenbroich | 425/541 |

FOREIGN PATENT DOCUMENTS

| | | | |
|---|---|---|---|
| 101026 | 2/1965 | Denmark | 425/541 |
| 2324437 | 4/1977 | France . | |
| 1679923 | 5/1971 | Germany . | |
| 1679951 | 4/1972 | Germany . | |
| 3643596 | 7/1987 | Germany | 425/541 |
| 1106602 | 3/1968 | United Kingdom . | |

OTHER PUBLICATIONS

Patent Abstracts of Japan, vol. 95, No. 002 of JP-A-07 032366 (Tahara:KK), Feb. 3, 1995.

*Primary Examiner*—Robert Davis
*Attorney, Agent, or Firm*—Davis and Bujold

[57] ABSTRACT

The invention concerns a press for blow-molding. This press (10) comprises a frame (11) on which there are mounted two movable plates (12, 13), each supported a half-mold (14, 15) and actuated by a mechanism for opening and closing the mold, which is formed of the two half-molds. Each of the movable plates is attached to a beam mounted on two axles (19, 20) so that it slides along these axles in opposite directions. The opening mechanism essentially consists of an actuator, two transmission blocks (29) and two pairs of connecting rods (33) connected to said movable plates. When the actuator drives the transmission blocks (29) in the direction of arrow A, the rods cause the mold to close. When the transmission block turns in the direction of arrow B, displacement of the rods causes the mold to open. The invention has applications for high speed molding presses in which the mold must be opened in rapid cycles.

10 Claims, 6 Drawing Sheets

BLOW-MOLDING PRESS

The present invention concerns a press for blow-molding thermoplastic containers, comprising two movable plates, each containing a half-mold, and an actuating mechanism to open and close the mold formed of half-molds.

Presses of this type which are known in the art are usually complex and heavy, with opening and closing devices controlled by cylinders or cumbersome toggle joints. For this reason, the presses are sluggish and consume a large amount of space on a production line.

The present invention proposes a higher performance press of lighter design, providing an opening and closing mechanism which is very compact and operates with precision.

This goal is achieved by the press according to the invention, characterized in that each plate is attached to a diagonal beam mounted on two fixed, parallel axles, with the beams sliding along these axles between two positions which correspond to opening and closing the mold, and further in that the opening and closing operations are controlled by a mechanism consisting of two pairs of connecting rods, each rod in each pair having one end attached to a pivot of a rotating transmission block, and the other end respectively attached to a pivot connected to the two plates, respectively.

Advantageously, the press comprises two transmission blocks mounted on a rotory motor shaft; each pair of connecting rods corresponds to one of said transmission blocks.

It further comprises a frame with a vertical central support that is preferably square or rectangular with a hollow central portion, both axles being attached to said support at two opposite points corresponding to the extremities of a diagonal.

In the preferred embodiment, the two transmission blocks are attached on either side of an actuator.

The beams attaching the plates may have end blocks at their extremities with an adjustable cylindrical groove for slidably attaching them to the axles.

The press further comprises blocking grip means which form stops to prevent the mold from opening, which grip means are designed to respectively grasp the axles. Each grip has two pivoting clamps and a cylinder which opens and closes the clamps, said cylinder body being integral with one of the clamps and said cylinder piston being integral with the other clamp.

Advantageously, the press further comprises two cavities respectively disposed between the beams and the corresponding movable plates, the cavities being designed to receive counter-pressure during the molding phase, when the mold is closed.

Preferably, each grip means cooperates with a blocking pin.

The present invention will be more readily understood with reference to the description of one preferred embodiment, which is given by way of non-limiting example, and to the attached drawings, in which.

Figure 1:
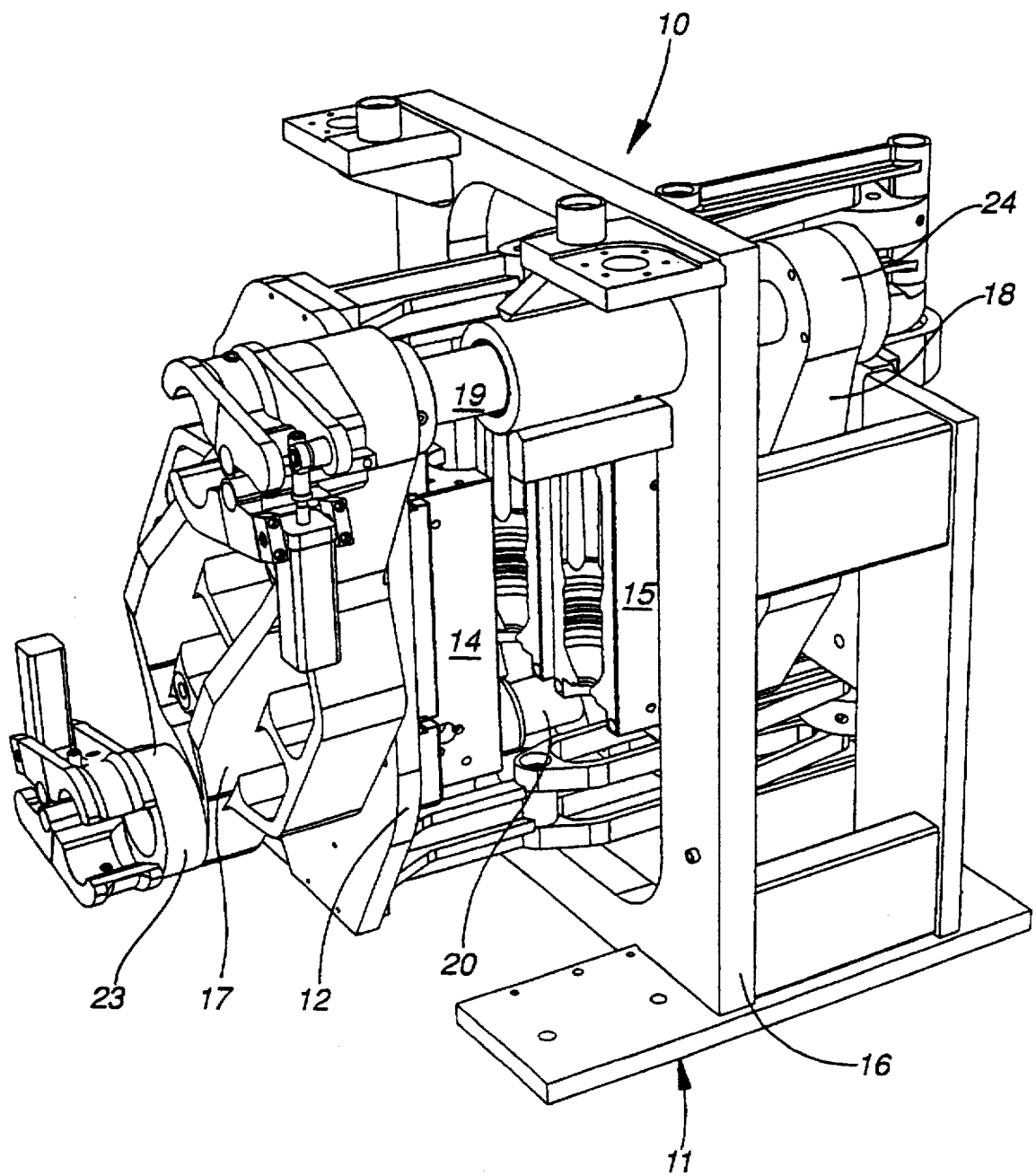
FIG. 1 is a perspective elevation of the press according to the invention in the open position.
Figure 2:
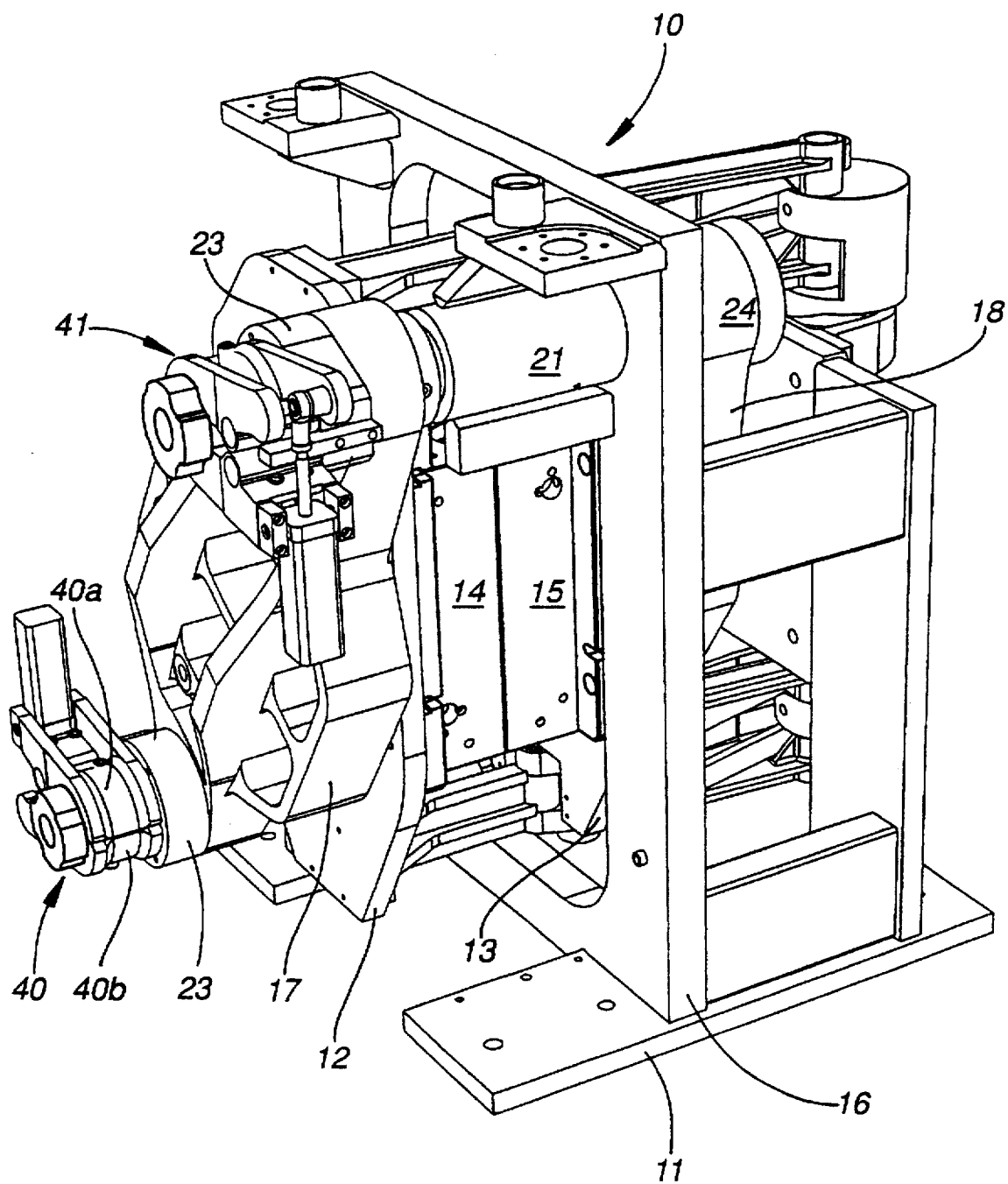
FIG. 2 is a perspective view similar to FIG. 1, but with the press shown in the closed position.

With reference to the drawings, press 10 as shown comprises a frame 11 on which there are mounted two movable plates 12 and 13, each holding a half-mold 14, 15, respectively, and actuated by an opening and closing mechanism which will be described in greater detail below. Frame 11 comprises a vertical central support 16, square or rectangular in shape, constructed of a single piece, in the form of a massive plate with a hollow central portion. This vertical support could be constructed differently; for example, it could be formed of four metal bars of square or rectangular section assembled in a square or rectangular formation. The two movable plates 12 and 13 are respectively supported by two beams 17 and 18, diagonally disposed in relation to vertical central support 16.

Said beams are attached to two axles 19 and 20, held by fixed cylindrical tubes 21 and 22, respectively, integral with said vertical central support, at two points corresponding to the extremities of a diagonal in actuality, the two beams 17 and 18 are parallel and supported by axles 19 and 20 so that they can slide along the axles in opposite directions. In practice, these beams are designed to be displaced along each other when the mold is being closed, said mold consisting of two half-molds 14 and 15, and to separate from each other when the mold is being opened. For this purpose, each beam comprises two end blocks, block 23 for beam 17 and block 24 for beam 18. The blocks are traversed by cylindrical bore, with a diameter that can be adjusted to adapt to the diameter of fixed axles 19 and 20, which support the beams and guide them during displacement. For this reason, the axles are parallel to each other and perpendicular to vertical central support 16. The axles are integral with beam 18 at one end and can slide inside cylindrical tubes 21 and 22. The two beams have a hollow massive structure for the purpose of stabilizing the plates which they respectively support, and ensuring that the half-molds remain tightly shut at the moment the blow-molding cavity or cavities inside the half-molds are pressurized.

Figure 6:
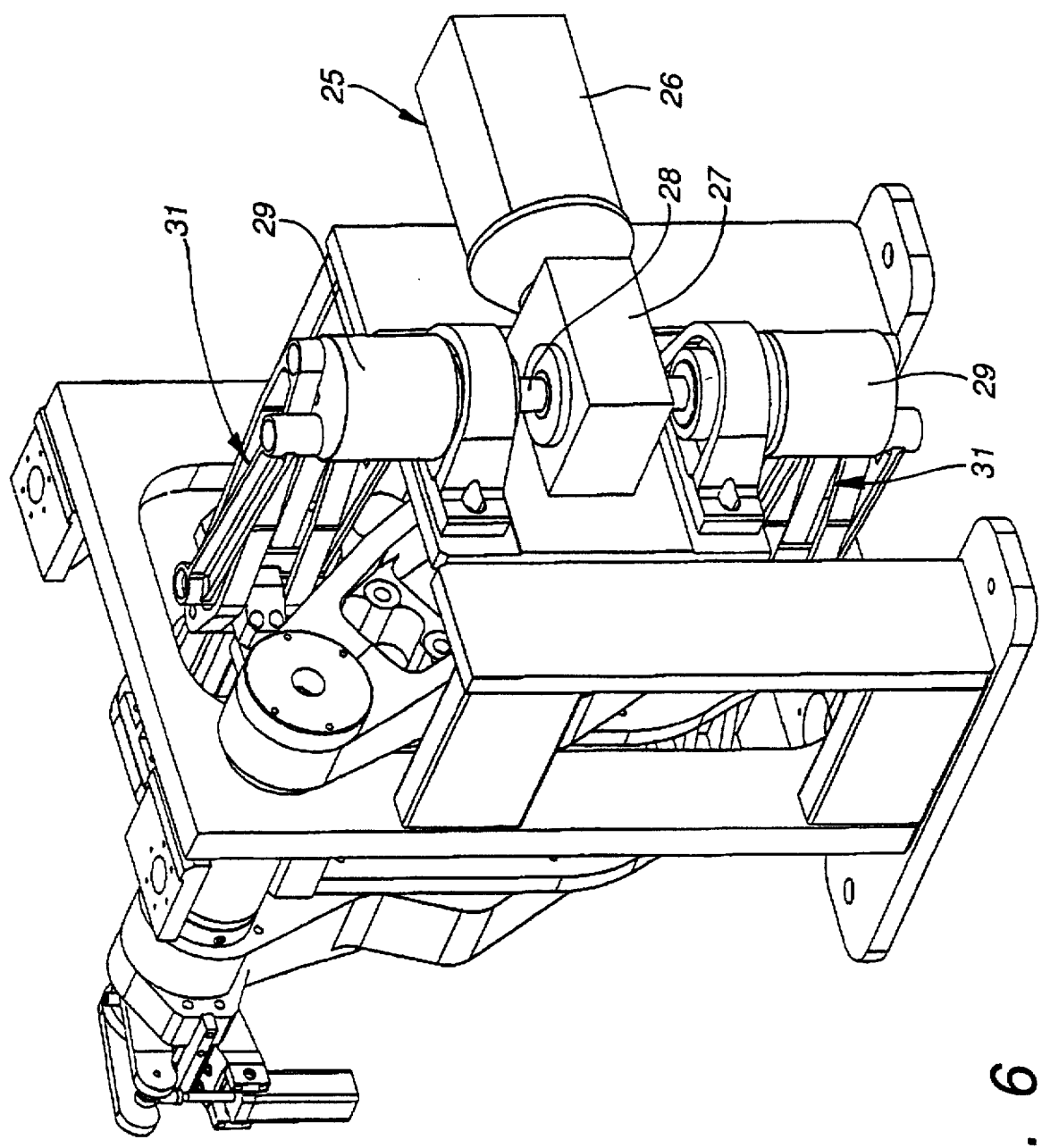
FIG. 6 shows a rear perspective view of the press according to the invention in the closed position.

The mold opening and closing device shown in FIG. 6 consists primarily, in the example shown, of an actuator 25 which may be an electric motor 26, a reduction gear 27, a rotating motor shaft 28, two transmission blocks 29 and two pairs of connecting rods 31 connected to said plates 12 and 13. The operation of this device is easily understood with reference to FIGS. 3 and 4. One connecting rod 33 of a pair 31 is attached at one end to a pivot 34 integral with transmission block 29, and at the other end, to a pivot 35 integral with plate 13. The other connecting rod 36 is attached at one end to a pivot 37 integral with transmission block 29 and at the other end, to a pivot 38 integral with an element 39 connected to plate 12.

The second pair 31 of rods which are connected to both the second transmission block and to the two plates 12 and 13 have a similar construction.

Figure 3:
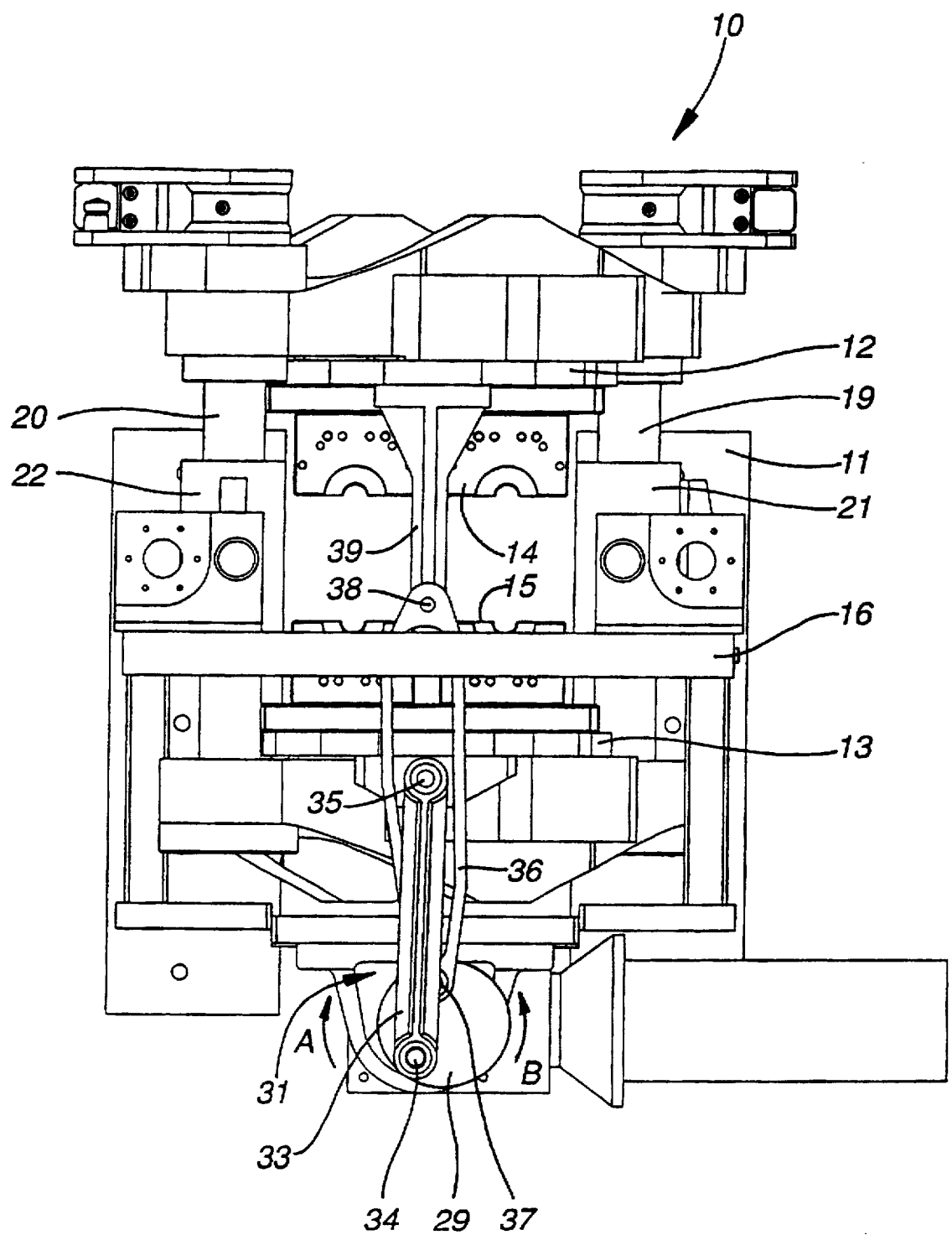
FIG. 3 is an overhead view showing the press of the invention in the open position.
Figure 4:
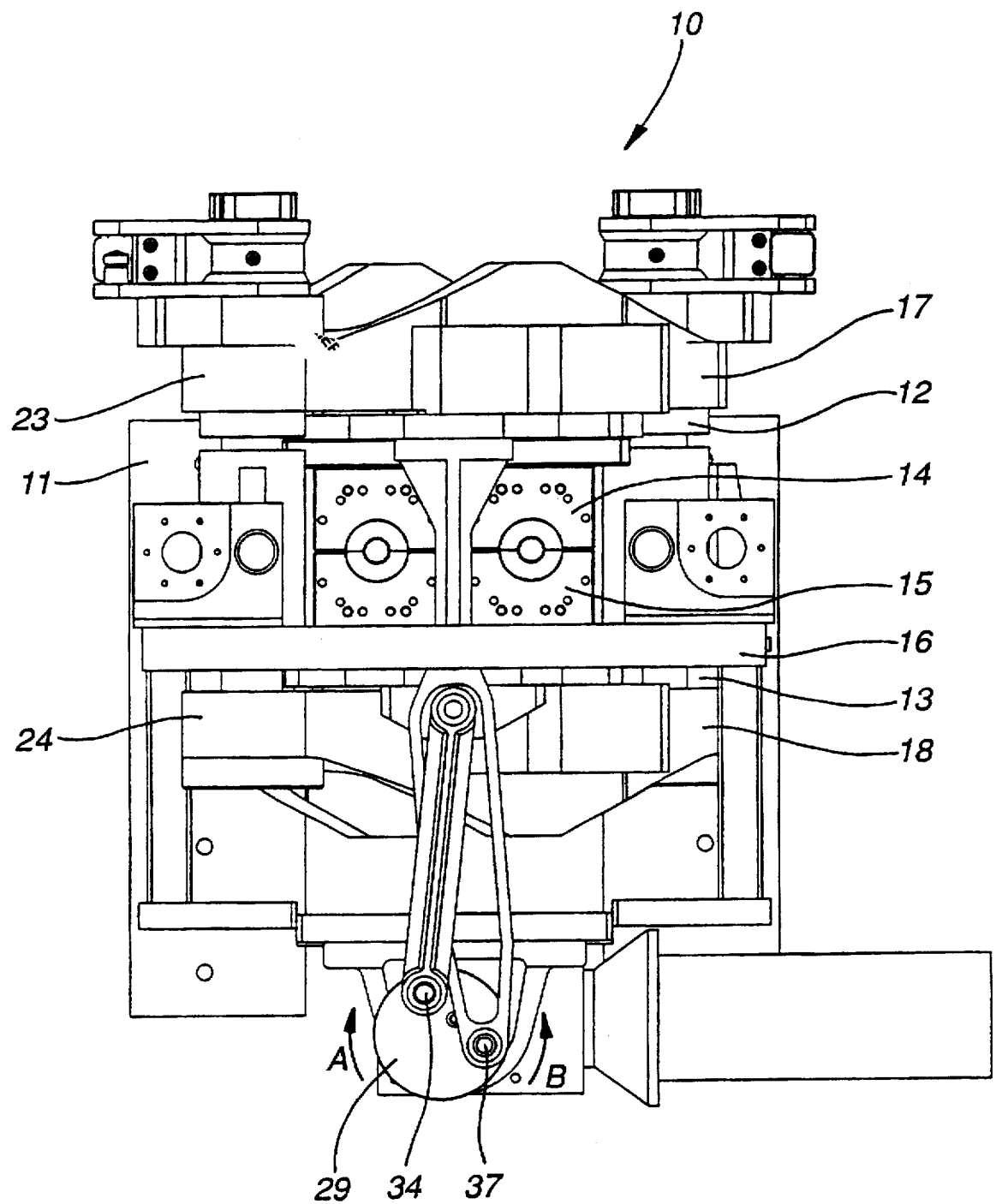
FIG. 4 is an overhead view showing the press of the invention in the closed position.
Figure 5:
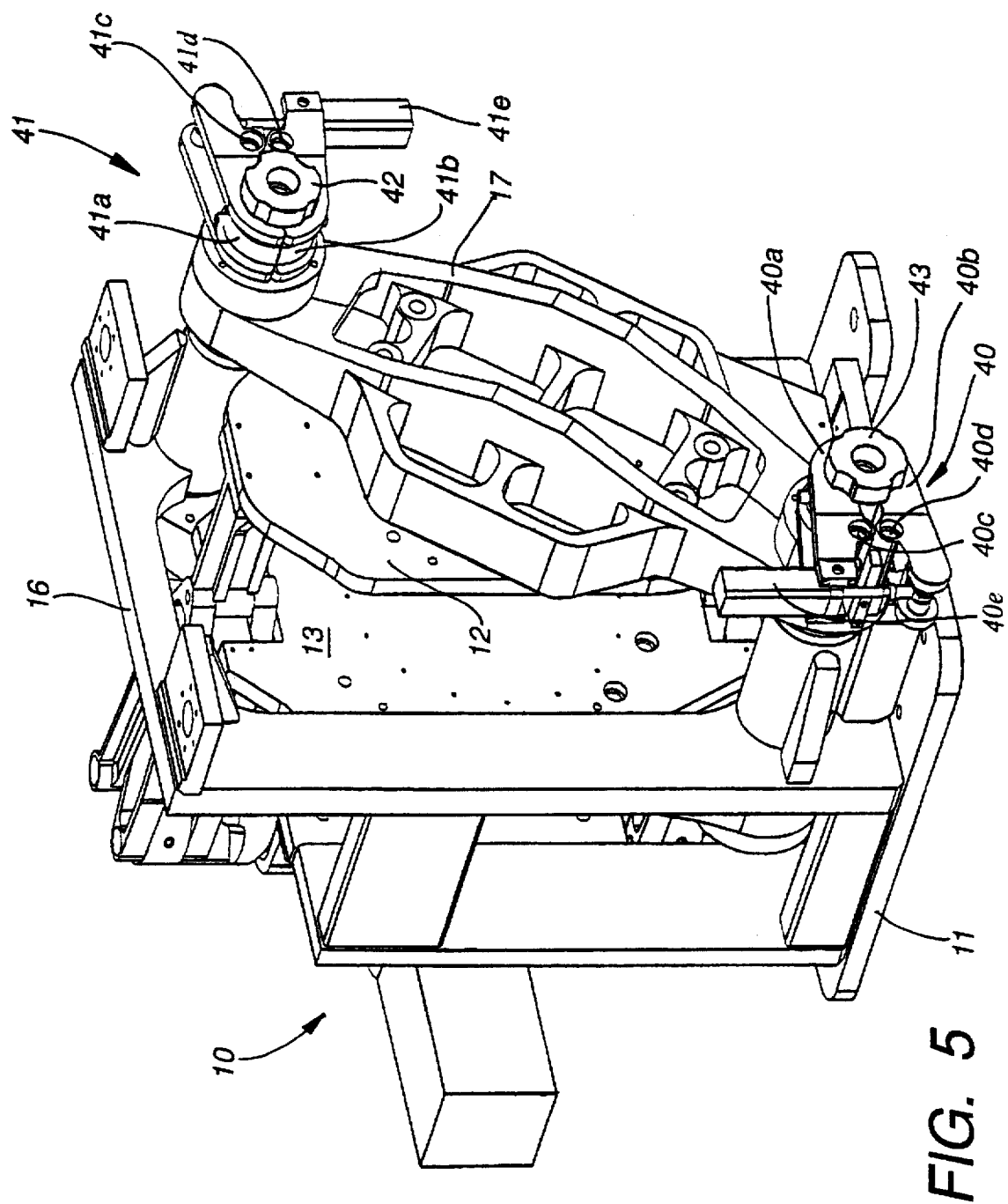
FIG 5 is a front perspective view of the press according to the invention in the closed position.

FIG. 3 shows the open mold. The operation of closing the mold takes place when the motor propels transmission blocks 29 in the direction of arrow A, causing them to turn at an angle of from about 120° to 150°. The relative displacement of pivots 34 and 37 corresponds to the operation of closing each half-mold 14 and 15. Rotation in the opposite direction, shown by arrow B, causes the mold to open.

To ensure that plates 12 and 13 are blocked, and thereby block half-molds 14 and 15, which are integral with these plates, in the closed position, the press is equipped with blocking grips 40 and 41 which serve as stops preventing any displacement of the plates in the direction of opening the mold when the blow-molding cavity in the mold is pressurized. Each grip has two clamps 40a, 40b and 41a, 40b, respectively, pivoting on axles 40c, 40d and 41c, 41d. The grips are opened and closed by means of two cylinders, 40e and 41e, respectively, with the cylinder body being attached to the extremity of one clamp and the cylinder piston to the extremity of the other clamp of each pair of clamps which form one grip.

In the closing position, the grips respectively grasp axles 19 and 20 between end blocks 23 of beam 17 and two blocking pins 42 and 43, affixed to the axle extremities. Thus, even if the elevated pressure within the mold at the time of blow-molding caused the plates to begin opening slightly, that is, if the restraints on rods 33 and 36 had a tendency to cause transmission blocks 29 to turn, grips 40 and 41 would provide such a rigid, effective block that it would be impossible for the plates to open.

If the plates, and consequently the half-molds, were to open in this way, it would have a very harmful effect on the quality of the molded products, as it would result in a mark on the product at the median joint, which is unacceptable.

In practice, the mold, or more precisely, the two half-molds, are also submitted to counter-pressure applied in the spaces defined by each plate 12 and 13 and the corresponding beam 17, 18. This counter-pressure actually amounts to about 40 bars; it is applied at the instant the cavity of the blow-mold is subjected to blow-molding pressure when the units are being blow-molded The present invention is not limited to the embodiment described above, but extends to any modification or variation obvious to a person skilled in the art. Actuator 25 could consist of a hydraulic or pneumatic shaft, or any other drive device.

I claim:

1. A press for blow-molding thermoplastic containers, comprising two movable plates (12, 13) each supporting a half-mold (14, 15) and an actuator mechanism for opening and closing the mold consisting of two half-molds, characterized in that each plate is attached to a diagonal beam (17, 18) attached to two fixed axles (19, 20) which are parallel to each other, said beams sliding along these axles between two positions corresponding to the mold opening and closing positions, and in that opening and closing of the mold is controlled by a mechanism consisting of two pairs (31) of connecting rods, each connecting rod (33, 36) in each pair (31) having one extremity attached to a pivot (34, 37) of a rotating transmission block (29), and the other extremity respectively attached to a pivot (35, 38) which is respectively connected to the two plates (13, 12).

2. A press according to claim 1, characterized in that it comprises two transmission blocks (29) mounted on a rotary motor shaft (28) and in that each pair (31) of connecting rods corresponds to one of said transmission blocks (29).

3. A press according to claim 1, characterized in that it comprises a frame with a vertical central support (16) of square or rectangular shape with a hollow central portion, and in that the two axles (19, 20) are mounted on said support at two opposing points corresponding to the extremities of a diagonal.

4. A press according to claim 1, characterized in that the two transmission blocks (29) are mounted on either side of an actuator (25).

5. A press according to claim 1, characterized in that the beams comprise end blocks (23, 24) at their extremities, traversed by a cylindrical bore that can be adjusted to allow the beams to slide along the axles (19, 20).

6. A press according to claim 1, characterized in that it comprises blocking grips (40, 41) which form stops to prevent the mold from opening, said grips being designed to respectively grasp the axles (19, 20).

7. A press according to claim 6, characterized in that each grip (40, 41) comprises two pivoting clamps (40a, 40b; 41a, 41b) and a cylinder (40e, 41e) which opens and closes the clamps.

8. A press according to claim 7, characterized in that the cylinder (40e, 41e) comprises a body integral with one of the clamps and a piston integral with the other clamp.

9. A press according to claim 7, characterized in that each grip (40, 41) cooperates with a blocking pin (42, 43).

10. A press according to claim 1, characterized in that it comprises two cavities respectively formed between the beams (17, 18) and the two corresponding movable plates (12, 13), said cavities being designed to receive counter-pressure at the time the pieces are blow-molded, when the mold is closed.

* * * * *